(12) United States Patent
Woh

(10) Patent No.: US 12,116,073 B1
(45) Date of Patent: Oct. 15, 2024

(54) SADDLE HAVING LASER PROJECTION DIRECTION-INDICATING DEVICE AND BICYCLE EQUIPPED WITH THE SADDLE

(71) Applicant: OXO PRO PTE. LTD., Singapore (SG)

(72) Inventor: Mike Woh, Singapore (SG)

(73) Assignee: OXO PRO PTE LTD., Singapore (SG)

( * ) Notice: Subject to any disclaimer, the term of this patent is extended or adjusted under 35 U.S.C. 154(b) by 0 days.

(21) Appl. No.: 18/479,941

(22) Filed: Oct. 3, 2023

(30) Foreign Application Priority Data

Sep. 14, 2023 (TW) .................................. 112209919

(51) Int. Cl.
   *B62J 6/057* (2020.01)
   *B62J 1/28* (2006.01)
   *B62J 6/04* (2020.01)
   *B62J 6/16* (2020.01)

(52) U.S. Cl.
   CPC ................. *B62J 6/057* (2020.02); *B62J 1/28* (2013.01); *B62J 6/04* (2013.01); *B62J 6/16* (2013.01)

(58) Field of Classification Search
   CPC ....... B62J 6/04; B62J 6/057; B62J 1/28; B62J 6/16
   See application file for complete search history.

(56) References Cited

U.S. PATENT DOCUMENTS

| | | | | |
|---|---|---|---|---|
| 5,561,414 A | * | 10/1996 | Chin | B62J 6/04 340/432 |
| 2011/0057781 A1 | * | 3/2011 | Lee | B62J 6/165 340/432 |
| 2018/0127042 A1 | * | 5/2018 | Kerbel | B62J 6/057 |
| 2020/0039594 A1 | * | 2/2020 | Ebrahemi | B62K 19/40 |

* cited by examiner

*Primary Examiner* — Thomas M Sember
(74) *Attorney, Agent, or Firm* — Rosenberg, Klein & Lee

(57) ABSTRACT

A saddle having a laser projection direction-indicating device is provided. The laser projection direction-indicating device has a module housing mounted to a saddle body. A left laser element is disposed in a left laser projection port of the module housing; a right laser element is disposed in a right laser projection port of the module housing. A control unit is connected with the left laser element and the right laser element. A direction signal generation unit is connected with the control unit and generates a left turn signal or a right turn signal to the control unit. The laser projection direction-indicating device responds to the left turn signal or the right turn signal generated by the direction signal generation unit to have the control unit drive the left laser element or the right laser element to generate a laser projection pattern.

8 Claims, 5 Drawing Sheets

SADDLE HAVING LASER PROJECTION DIRECTION-INDICATING DEVICE AND BICYCLE EQUIPPED WITH THE SADDLE

BACKGROUND OF THE INVENTION

1. Field of the Invention

The present invention relates to a saddle having a direction-change signaling function, and more particularly to a saddle having a laser projection direction-indicating device and a bicycle equipped with the saddle.

2. The Related Arts

Cycling is now very prevailing, and various accessories have been widely used and have been made professionalized. Concerning the various accessories that are currently available for safety purposes, to improve cycling safety, the manufacturers have developed various alarm lights of different types and functions for being mounted by a user to the front, rear, and lateral sides of a bicycle. There are also products that are available for attaching to the body or head of the rider. However, such attached alarm lights are only developed focusing on differentiation of variation of lighting and light source mounting locations. For the riders, there is still a room for improving the riding safety.

Although, among the various bicycle accessories for safety purposes, signal lights have been well developed with dynamic operation for left and right turning of a bicycle, yet in practical uses, such known devices are still considered imperfect, and the bicycle rider may easily get a traffic accident when turning with riding on a bicycle.

SUMMARY OF THE INVENTION

Thus, an objective of the present invention is to provide a saddle having a laser projection direction-indicating device and a bicycle equipped with the saddle, in order to provide better safety for a bicyclist riding a bicycle in making left and right turnings to thereby avoid undesired traffic accidents.

To achieve the above objective, the present invention provides a saddle having a laser projection direction-indicating device, which comprises a module housing mounted to a rear end of the saddle body; a left laser element disposed in a left laser projection port of the module housing; a right laser element disposed in a right laser projection port of the module housing; a control unit connected with the left laser element and the right laser element; and a direction signal generation unit connected with the control unit and is operable to generate one of a left turn signal and a right turn signal to the control unit. The control unit responds to the left turn signal to generate a left-turning driving signal to drive the left laser element to generate a left-side laser projection pattern, which is projected outwards through the left laser projection port; and the control unit responds to the right turn signal to generate a right-turning driving signal to drive the right laser element to generate a right-side laser projection pattern, which is projected outwards through the right laser projection port.

In efficacy, the saddle according to the present invention is mounted to a bicycle such that the bicycle generates, when making left turning, a left-side laser projection pattern that is projected to a ground surface at a predetermine distance from a left side of the bicycle, and generates, when making right turning, a right-side laser projection pattern that is projected to a ground surface at a predetermine distance from a right side of the bicycle. Further, when generating the left-turning driving signal to drive the left laser element to generate the left-side laser projection pattern, the control unit simultaneously drives a left turn signal light; and when generating the right-turning driving signal to drive the right laser element to generate the right-side laser projection pattern, the control unit simultaneously drives a right turn signal light. By means of the arrangement according to the present invention, enhanced safety is provided for a bicycle making left turning or right turning, in order to avoid traffic accidents. Particularly, the safety of a cyclist may be further enhanced when the bicycle is traveling through a tunnel or a dark site.

A technical solution adopted in the present invention will be further described with reference to embodiments provided below and the attached drawings.

DETAILED DESCRIPTION OF THE PREFERRED EMBODIMENTS

Figure 1:
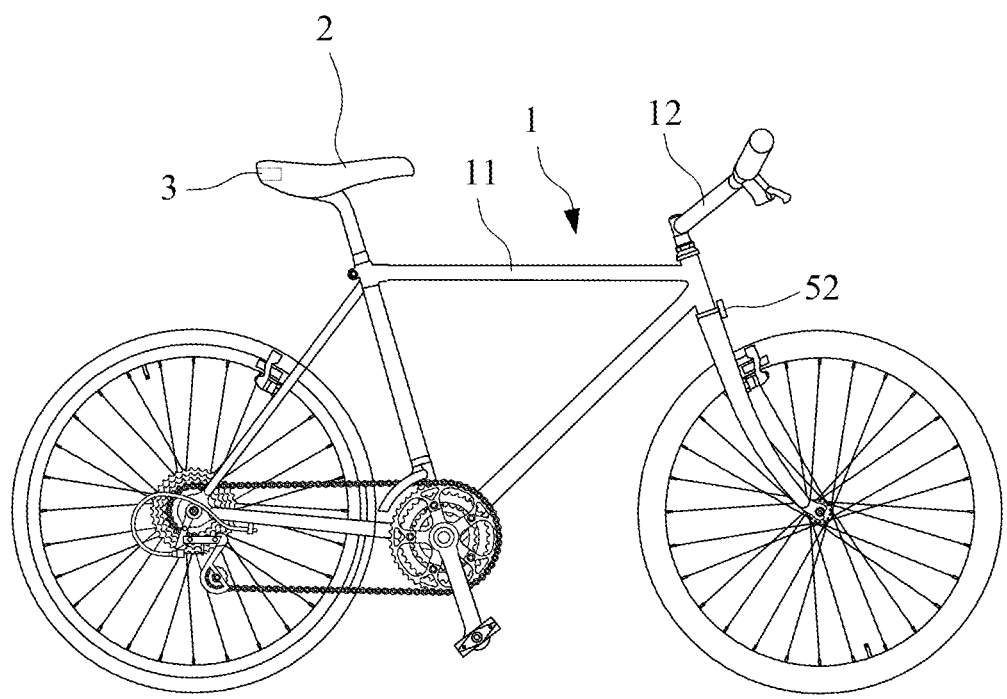
FIG. 1 is a schematic view showing a bicycle saddle equipped with a laser projection direction-indicating device according to the present invention.

Referring to FIG. 1, the present invention provides a saddle 2 of a bicycle 1, which is combined with a laser projection direction-indicating device 3, so that when a user rides the bicycle, the laser projection direction-indicating device 3 may generate a laser beam to catch other passersby' attention for enhancing riding safety for the user.

Figure 2:
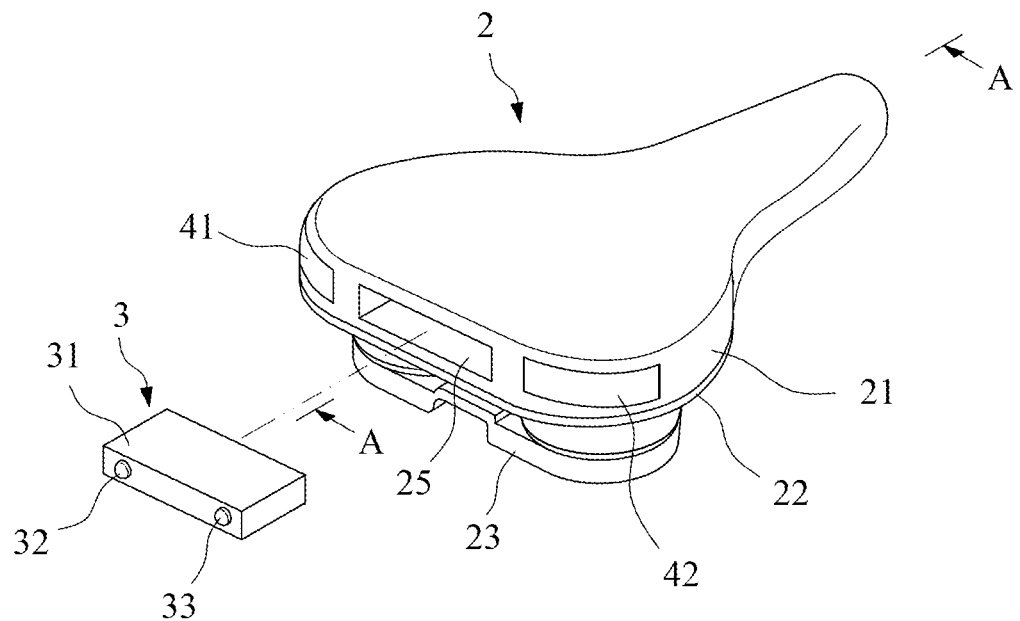
FIG. 2 is a perspective view showing a laser projection direction-indicating device of the present invention is separated from a saddle.
Figure 3:
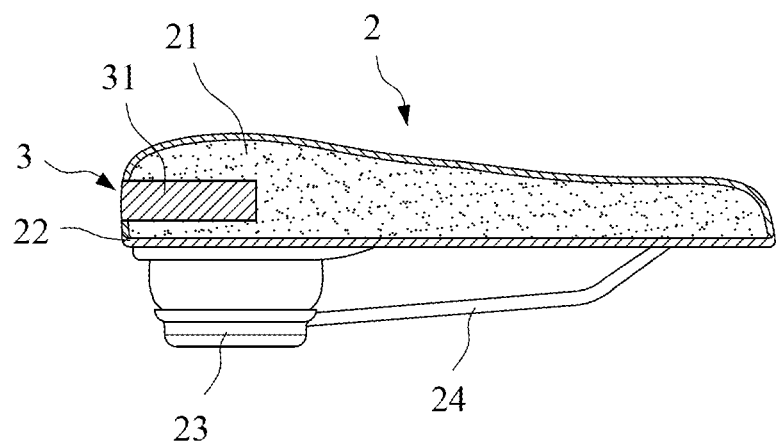
FIG. 3 is a cross-sectional view taken along section A-A of FIG. 2.

Referring to FIGS. 2 and 3, FIG. 2 is a perspective view showing the laser projection direction-indicating device 3 of the present invention is separated from the saddle 2, and FIG. 3 is a cross-sectional view taken along section A-A of FIG. 2. As shown in the drawings, the saddle 2 that is combined with a laser projection direction-indicating device according to the present invention comprises a saddle body 21 and a base plate 22. The saddle 2 is mounted to a seat post of the bicycle 2 by means of the base plate 22, a support base 23, a mounting rack 24, and known installation components (not shown).

In the present invention, the laser projection direction-indicating device 3 can be of a modularized structure, meaning it includes a module housing 31 mountable to a rear end of the saddle body 21. Preferably, the module housing 31 is received and held in a receiving space 25 of the saddle body 21 or is mounted to the base plate 22 or the support base 23 of the saddle 2.

A left laser element 32 is disposed in a left laser projection port of the module housing 31; and a right laser element 33 is disposed in a right laser projection port of the module housing 31. In an actual product, the left laser projection port points toward a site below a left side of the saddle, and the right laser projection port points toward a site below a right side of the saddle, and optical components (such as a collimating lens, a focusing lens, or an optical lens having a pattern or text) may be provided in the left laser projection port and the right laser projection port.

The present invention further comprises a left turn signal light 41, which is arranged at a left-side location of the saddle 2 that is adjacent to the module housing 31; and a right turn signal light 42, which is arranged at a right-side location of the saddle 2 that is adjacent to the module housing 31.

Figure 4:
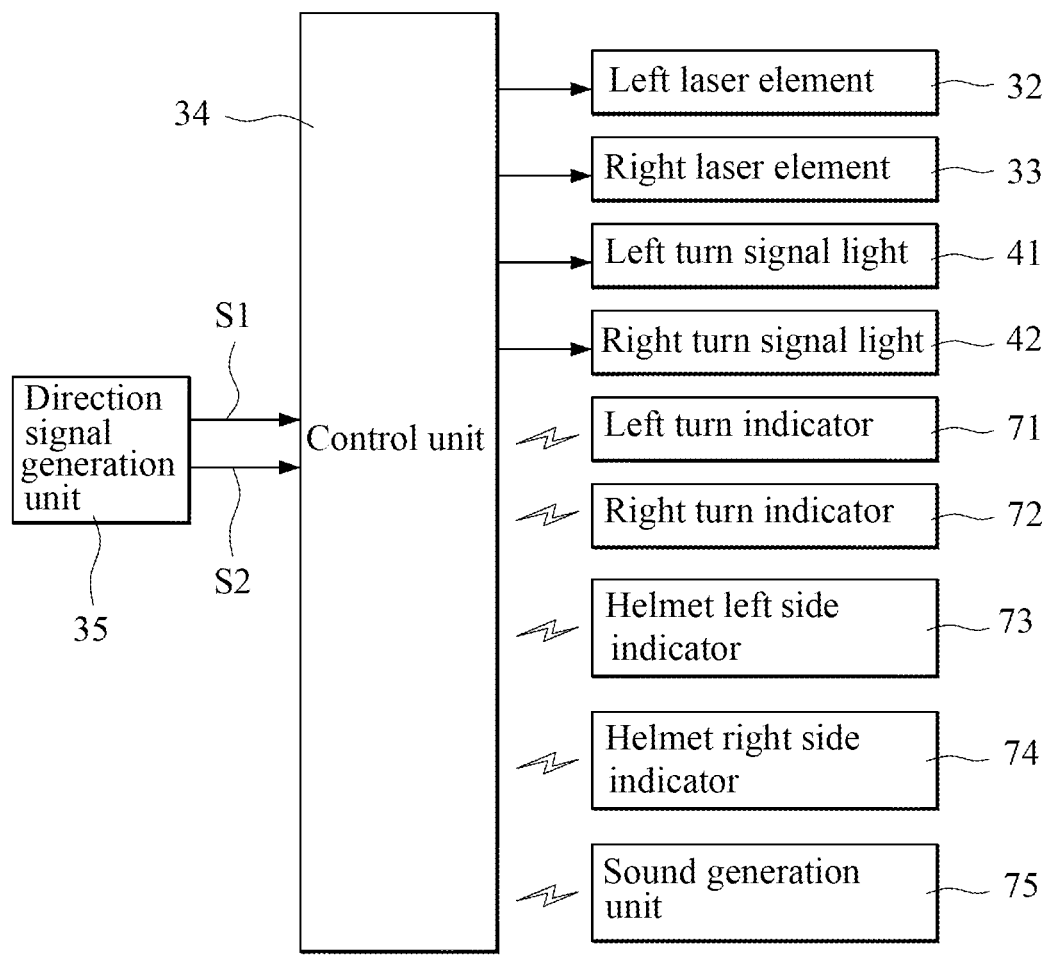
FIG. 4 is a block diagram showing a control circuit according to a first embodiment of the present invention.

FIG. 4 shows a diagram of a control circuit according to a first embodiment of the present invention, which comprises a control unit 34 and a direction signal generation unit 35. The left laser element 32, the right laser element 33, the left turn signal light 41, and the right turn signal light 42 are all electrically connected with the control unit 34. The present invention may further comprise a helmet left side indicator 73, which is arranged at a left-side location of a helmet of a rider of the bicycle 1; and a helmet right side indicator 74, which is arranged at a right-side location of the helmet of the rider of the bicycle 1. The control unit 34 transmits a control signal, in a wired or wireless (such as Bluetooth wireless interface) manner, to each of the indicators and lights. A sound generation unit 75 may also be connected with the control unit 34.

The direction signal generation unit 35 is also connected to the control unit 34. The direction signal generation unit 35 can be a manually-operating switch mounted to for example a predetermined location of a bicycle handlebar. When manually operated by the user, the direction signal generation unit 35 generates one of a left turn signal S1 and a right turn signal S2 to the control unit 34.

Upon receiving the left turn signal S1 or the right turn signal S2 generated by the direction signal generation unit 35, the control unit 34 drives the left laser element 32 or the right laser element 33 to generate a laser beam and also simultaneously drives the left turn signal light 41, the right turn signal light 42, the helmet left side indicator 73, or the helmet right side indicator 74 to generate visible light and also optionally has the sound generation unit 75 generating reminder sounds.

Figure 5:
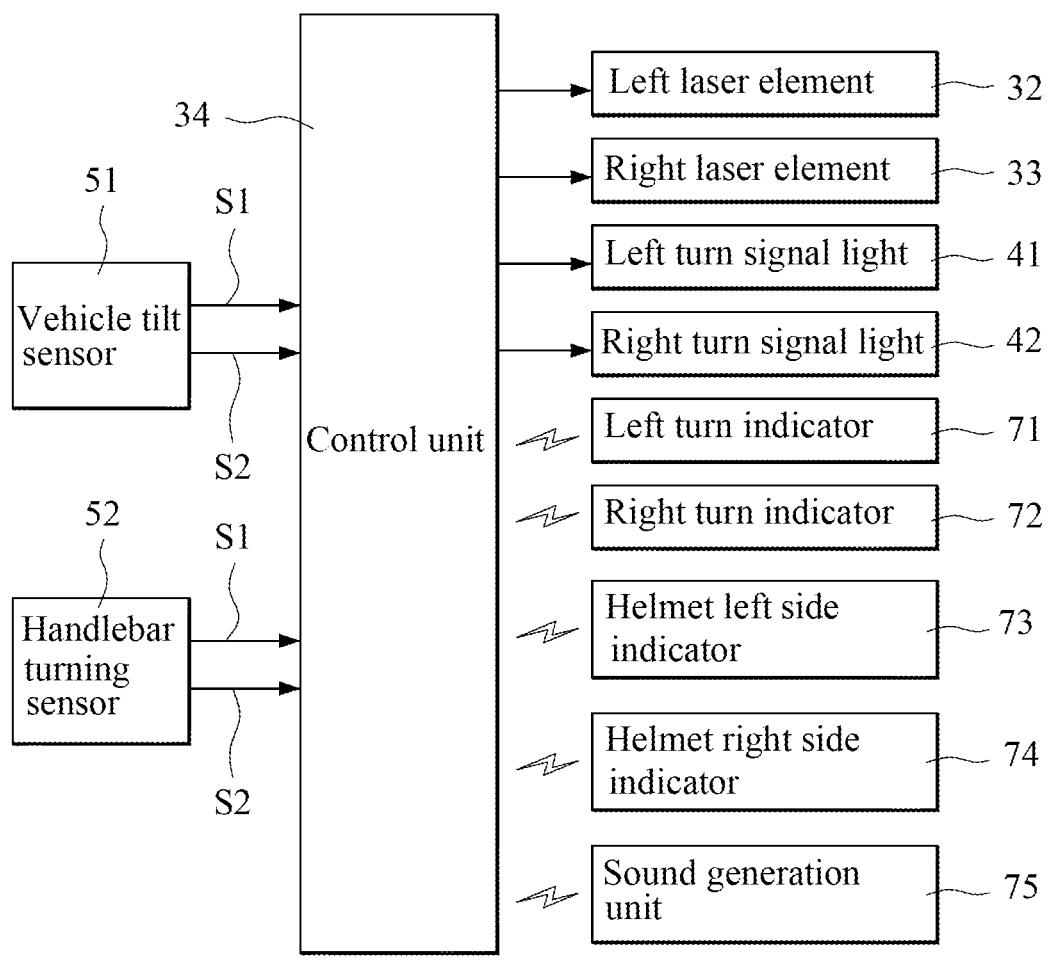
FIG. 5 is a block diagram showing a control circuit according to a second embodiment of the present invention.

FIG. 5 shows a diagram of a control circuit according to a second embodiment of the present invention, of which circuit components are generally similar to those of the first embodiment, and thus, identical components are designated with similar reference signs for consistency. In the instant embodiment, a vehicle tilt sensor 51 and/or a handlebar turning sensor 52 is included and connected with the control unit 34.

The vehicle tilt sensor 51 is mounted to the saddle or a frame 12 of the bicycle or any other location to detect a tilt angle of the bicycle during movement thereof in order to determine whether the bicycle is making left turning or right turning during the movement to thereby generate one of a left turn signal S1 and a right turn signal S2 to the control unit 34. The handlebar turning sensor 52 is mounted on a selected location of the bicycle handlebar 11 to detect a turning operation of the bicycle handlebar 11 in order to determine whether the bicycle is taking left turning or right turning to thereby generate one of the left turn signal S1 and the right turn signal S2 to the control unit 34.

Upon receiving the left turn signal S1 or the right turn signal S2 generated by the vehicle tilt sensor 51 or the handlebar turning sensor 52, the control unit 34 drives the left laser element 32 or the right laser element 33 to generate a laser beam and also drives the left turn signal light 41 or the right turn signal light 42 to generate visible light.

Figure 6:
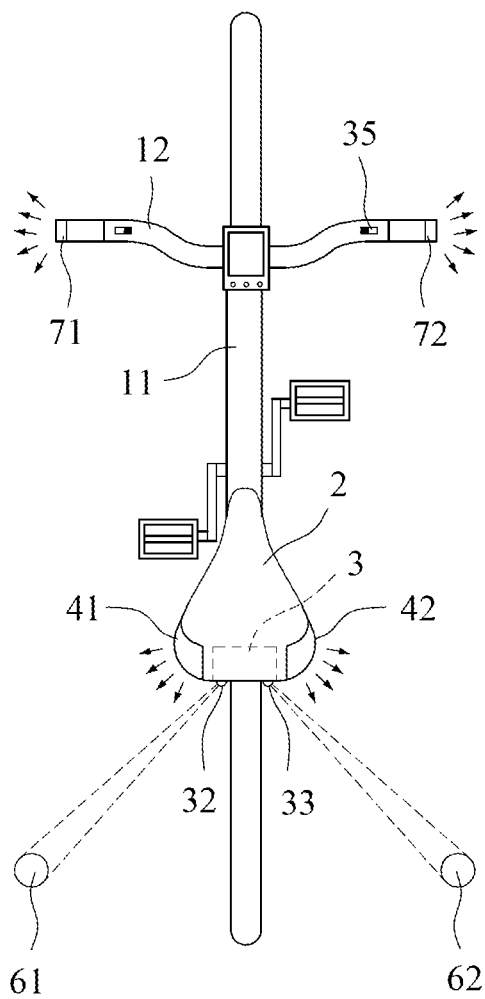
FIG. 6 is a top plan view showing a bicycle is assisted by the laser projection direction-indicating device according to the present invention to timely project a left-side laser projection pattern or a right-side laser projection pattern for left turning or right turning.

FIG. 6 is a top plan view showing the bicycle 1, as being assisted by the laser projection direction-indicating device 3 according to the present invention, timely projects a left-side laser projection pattern or a right-side laser projection pattern for left turning or right turning.

Upon receiving the left turn signal S1 generated by the direction signal generation unit 35, the vehicle tilt sensor 51, or the handlebar turning sensor 52, the control unit 34 generates a left-turning driving signal to drive the left laser element 32 to generate a left-side laser projection pattern 61, which is projected through the left laser projection port of the module housing 31 of the laser projection direction-indicating device 3 to a ground surface at a predetermined distance from a left side of the bicycle 1, and simultaneously, the control unit 34 drives the left turn signal light 41 to generate visible light to catch the attention of other passersby at a rear side or left side of the bicycle. Optionally, a left turn indicator 71 may be mounted to the bicycle at other locations (such as a left-side end of the handlebar or a left side of the frame) to further improve riding safety.

Upon receiving the right turn signal S2 generated by the direction signal generation unit 35, the vehicle tilt sensor 51, or the handlebar turning sensor 52, the control unit 34 generates a right-turning driving signal to drive the right laser element 33 to generate a right-side laser projection pattern 62, which is projected through the right laser projection port of the module housing 31 of the laser projection direction-indicating device 3 to a ground surface at a predetermined distance from a right side of the bicycle 1, and simultaneously, the control unit 34 drives the right turn signal light 42 to generate visible light to catch the attention of other passersby at a rear side or right side of the bicycle. Optionally, a right turn indicator 72 may be mounted to the bicycle at other locations (such as a right-side end of the handlebar or a right side of the frame) to further improve riding safety.

The left-side laser projection pattern 61 and the right-side laser projection pattern 62 as discussed above are each formed, in an example, as a light spot for implementation of laser projection pattern, and in an actual product, it can be made as a pattern of other shapes (such as a crisscross pattern, a straight line pattern, a pattern carrying characters, and a pattern carrying a figure).

The embodiments provided above are implemented by taking a saddle of a bicycle as an example for explanation and illustration. In practical applications, the present invention is applicable to other transportation tools, such as an electric bicycle, an electric walk-substituting vehicle, an electric scooter, an electrically-assisted bicycle, and an electric shopping cart.

What is claimed is:

1. A saddle including a base plate and a saddle body supported on the base plate, said saddle body having a recessed receiving space formed inside the saddle body at a rear portion of the saddle, wherein the saddle is provided with a laser projection direction-indicating device, the laser projection direction-indicating device comprising:

a module housing inserted in flush manner within the recessed receiving space of the saddle body of the saddle, thereby the module housing being substantially isolated from an external environment, and a left laser projection port and a right laser projection port are formed on the module housing to project in a direction away from the module housing and through the recessed receiving space;
a left laser element disposed in the left laser projection port of the module housing;
a right laser element disposed in the right laser projection port of the module housing;
a control unit mounted inside the module housing and connected with the left laser element and the right laser element, wherein the control unit is fully enclosed within the saddle body of the saddle; and
a direction signal generation unit connected with the control unit and operable to selectively generate either one of a left turn signal or a right turn signal, the left turn signal and the right turn signal being selectively sent by the direction signal generation unit to the control unit;
wherein upon receiving the left turn signal, the control unit responsively generates a left-turning driving signal to thereby drive the left laser element to project a left-side laser projection pattern; and
wherein upon receiving the right turn signal, the control unit responsively generates a right-turning driving signal to thereby drive the right laser element to project a right-side laser projection pattern.

2. The saddle according to claim 1, further comprising:
a left turn signal light arranged at a left-side location of the saddle to be adjacent to the module housing, thereby the control unit, when generating the left-turning driving signal to drive the left laser element to generate the left-side laser projection pattern, simultaneously drives the left turn signal light; and
a right turn signal light arranged at a right-side location of the saddle to be adjacent to the module housing, thereby the control unit, when generating the right-turning driving signal to drive the right laser element to generate the right-side laser projection pattern, simultaneously drives the right turn signal light.

3. The saddle according to claim 1, wherein the direction signal generation unit includes one of a manually-operated switch or a vehicle tilt sensor, the manually-operated switch and the vehicle tilt sensor being operable to generate the left turn signal or the right turn signal.

4. A bicycle including a saddle having a base plate and a saddle body supported on the base plate, the saddle being mounted to a seat post of the bicycle, said saddle body having a recessed receiving space formed inside the saddle body at a rear portion of the saddle, wherein the bicycle is provided with a laser projection direction-indicating device, the laser projection direction-indicating device comprising:
a module housing inserted in flush manner within the recessed receiving space of the saddle body, thereby the module housing being substantially isolated from an external environment, and a left laser projection port and a right laser projection port are formed on the module housing to project in a direction away from the module housing and through the recessed receiving space;
a left laser element disposed in the left laser projection port of the module housing;
a right laser element disposed in the right laser projection port of the module housing;
a control unit mounted inside the module housing and connected with the left laser element and the right laser element, wherein the control unit is fully enclosed within the saddle body of the saddle; and
a direction signal generation unit connected with the control unit and operable to selectively generate either one of a left turn signal or a right turn signal, the left turn signal and the right turn signal being selectively sent by the direction signal generation unit to the control unit;
wherein upon receiving the left turn signal, the control unit responsively generates a left-turning driving signal to thereby drive the left laser element to generate a left-side laser projection pattern, the left-side laser projection pattern being projected towards a ground surface at a predetermined distance from a left side of the bicycle; and
wherein upon receiving the right turn signal, the control unit responsively generates a right-turning driving signal to thereby drive the right laser element to generate a right-side laser projection pattern, the right-side laser projection pattern being projected towards a ground surface at a predetermined distance from a right side of the bicycle.

5. The bicycle according to claim 4, further comprising:
a left turn signal light arranged at a left-side location of the saddle to be adjacent to the module housing, thereby the control unit, when generating the left-turning driving signal to drive the left laser element to generate the left-side laser projection pattern, simultaneously drives the left turn signal light; and
a right turn signal light arranged at a right-side location of the saddle to be adjacent to the module housing, thereby the control unit, when generating the right-turning driving signal to drive the right laser element to generate the right-side laser projection pattern, simultaneously drives the right turn signal light.

6. The bicycle according to claim 4, further comprising:
a left turn indicator mounted to a left-side location of one of a bicycle handlebar and a frame, thereby the control unit, when generating the left-turning driving signal to drive the left laser element to generate the left-side laser projection pattern, simultaneously drives the left turn indicator; and
a right turn indicator mounted to a right-side location of one of the bicycle handlebar and the frame, thereby the control unit, when generating the right-turning driving signal to drive the right laser element to generate the right-side laser projection pattern, simultaneously drives the right turn indicator.

7. The bicycle according to claim 4, further comprising:
a helmet left side indicator arranged at a left-side location of a helmet, thereby the control unit, when generating the left-turning driving signal to drive the left laser element to generate the left-side laser projection pattern, simultaneously drives the helmet left side indicator; and
a helmet right side indicator arranged at a right-side location of the helmet, thereby the control unit, when generating the right-turning driving signal to drive the right laser element to generate the right-side laser projection pattern, simultaneously drives the helmet right side indicator.

8. The bicycle according to claim 4, wherein the direction signal generation unit includes either one of a manually-operated switch, a vehicle tilt sensor, or a handlebar turning sensor, the manually-operated switch, the vehicle tilt sensor, and the handlebar turning sensor, being operable to generate the left turn signal or the right turn signal.

* * * * *